Aug. 29, 1933.  A. SZEGVARI  1,924,576
METHOD OF TREATING RUBBER COMPOSITIONS
Original Filed Oct. 6, 1927
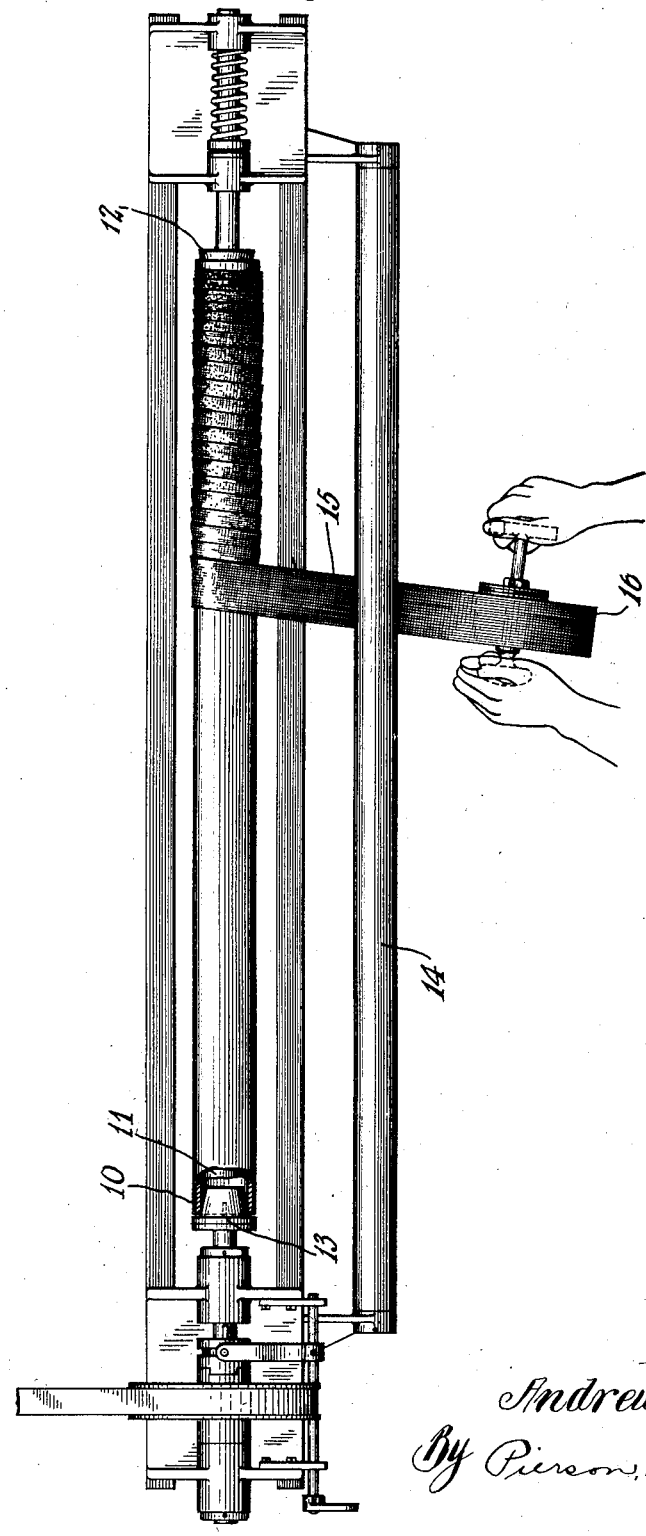
Inventor
Andrew Szegvari
By Pierson, Eakin + Avery
Attys.

Patented Aug. 29, 1933

1,924,576

UNITED STATES PATENT OFFICE 1,924,576

METHOD OF TREATING RUBBER COMPOSITIONS

Andrew Szegvari, Akron, Ohio, assignor to American Anode, Inc., Akron, Ohio, a corporation of Delaware Continuation of application Serial No. 224,505, October 6, 1927. This application January 9, 1931. Serial No. 507,721

7 Claims. (Cl. 18—50)

This invention relates to a method of treating rubber compositions formed by deposition from aqueous dispersions thereof and more particularly to the removal in large part of the liquid constituents of a layer of a rubber composition of the character hereinabove indicated.

It has been heretofore proposed to deposit from a natural or artificial aqueous dispersion of rubber upon a form or other foundation member, which may be either of porous or non-porous material, a layer or body of rubber by dipping, suction, electrodeposition, spraying, spreading and other well known layer forming processes. The deposits formed from such rubber dispersions are ordinarily coagulated as layers of a more or less firm irreversible coagulum, either by the electrolytic action of the current employed in electrodeposition, or by a coagulant substance such as an acid or a coagulating salt constituting a portion of the form or applied to the surface of the layers of the dispersion on the form, or by other means. The layers or bodies of composition formed in any of these ways contain a large amount of liquid, for the most part water, which needs be removed from the layer or body prior to vulcanization if dense, homogeneous and uniform products are to be obtained.

The object of this invention is to provide a method for the manufacture of rubber goods directly from aqueous dispersions, in which method a large part of the liquid content of a deposited layer of a rubber composition of the character hereinabove indicated may easily and quickly be removed.

In carrying out this invention, a freshly deposited layer of a rubber composition formed from an aqueous dispersion of the rubber composition is subjected to a uniform compacting pressure by the application thereto of a pervious material, the pressure preferably being applied in such manner as not materially to disturb the relative positions of the particles of rubber composition one to another, except to bring them into closer contact by the compacting pressure. It is obvious that the pervious material employed to apply the compacting pressure may be any one of a number of water permeable or porous materials and that the compacting pressure may be applied in a variety of ways.

In the accompanying drawing an industrially operative method of applying a pervious material with the compacting pressure to a layer of rubber composition deposited from an aqueous dispersion thereof is shown, it being understood that the means disclosed in the drawing are merely illustrative of the principle of this invention, which is, however, in no way limited to the mechanism shown in the drawing, and in which the figure is a plan view of an apparatus adapted for the practice of my invention with the rubber composition to be treated deposited upon a cylindrical form.

In the drawing, there is shown a means for treating a rubber layer 10 freshly deposited from an aqueous dispersion thereof upon a cylindrical tubular form or mandrel 11, such as may be used in the manufacture of inner tubes for pneumatic vehicle tires or for making of rubber band stock. It will be understood, however, that the form 11 may be of other shape and proportions and that it may be solid as well as hollow and of porous material if desired.

As shown, the mandrel 11 is mounted for rotation upon its own axis in any suitable apparatus, it being illustrated herein as supported from its ends in the tail-spindle 12 and in the driving-head 13 of a machine resembling a lathe in construction. A fixed bar 14 is positioned adjacent and parallel to the mandrel 11 to serve as a guide for the pervious material 15, such as a woven fabric strip, employed to place the rubber layer 10 under compression.

In carrying out my invention, the mandrel 11 with its freshly deposited composition of rubber 10 is mounted with its ends supported in the tail-spindle 12 and the driving-head 13, respectively. The end of the pervious strip material 15 is passed under the bar 14 and then secured to the mandrel 11 at one end thereof, as by making initial overlapping turns about the mandrel in such manner as to completely overlie the deposit 10 at that end of the mandrel. The driving-head 13 is then set in motion to rotate the mandrel and to draw the strip 15 thereonto, a supply roll 16 for said strip material being moved longitudinally of the mandrel so that the strip 15 is laid thereon in overlapping helical convolutions. The withdrawal of the strip 15 from its supply roll 16 is retarded, as by braking action at the supply roll and a snubbing effect on the bar 14 so that the strip is laid on the deposit 10 under a considerable tension and exerts a substantially inwardly and radially directed compacting force upon the deposit 10. Due to the tension with which the strip 15 is wound upon the deposit 10 it continues to exert a compacting or squeezing pressure which forces the moisture from the deposit 10 out through the pervious strip 15, the liquid collecting on the exterior thereof where it may drip therefrom, or if desired, may be wiped therefrom by the application of an absorbent material. If the deposit 10 is formed upon a porous form or mandrel, it will be obvious that some of the liquid of the deposited rubber composition will be forced into and through pores or foramina of the foundation material. The deposited rubber, being already coagulated, is not capable of penetrating the meshes or pores of the pervious material, the rubber particles instead being brought into closer and more intimate relationship with one another.

The separation of the liquid from the solid constituents of the rubber deposit is accomplished for the most part very quickly after the application of the compacting pressure. The pervious strip 15 may however, be allowed to remain in pressure contact with the deposit for some time, as until little or no further liquid exudes from the deposit. In practice, a single wrapping of the pervious material removed from the deposit immediately or shortly after its application, serves to express the water and compact the rubber sufficiently for manufacturing purposes.

In processes involving the principles of this invention, namely, the application of a compacting pressure to a rubber composition freshly deposited from an aqueous dispersion thereof by means of a pervious material, a notable improvement in the density, homogeneity, strength, and other qualities of the rubber composition layer is produced. Thus, the compacting force of the pervious material so consolidates and amalgamates the solid particles of the deposit 10 that it may be stripped immediately from the mandrel 11 without any material permanent deformation. In commercial operations the application of the pervious material with compacting pressure to deposit 10, the removal of the pervious material from the compacted deposit and the stripping of the compacted deposit from the mandrel may be carried out in close succession. The liquid remaining in the deposit is normally removed by evaporation, as by exposing the deposit to a current of warm air, after which the deposit is ready for vulcanization which may be carried out by any of the well known processes of vulcanization.

While it has been found that a single application of compacting pressure by the method herein described is generally sufficient for industrial manufacturing operations, in certain cases the application of the compacting pressure may be repeated one or more times, or a number of layers of the pervious compacting material may be successively applied one to the other. It has been found, however, that where an adequate compacting pressure is applied by any of the hereinabove described processes that subsequent applications of compacting pressure does not sufficiently add to the quality of the product or reduce the amount of its liquid content to make it in general an economically commercial variation of the processes hereinbefore described, although it may be useful in some special cases.

In addition to the advantages hereinabove noted, including the reduction of the time required for the manufacture of articles or materials of rubber compositions deposited from aqueous dispersions thereof and improvement in the strength and properties of such articles and materials, my process has another secondary and distinctive advantage in that it enables the forms on which the deposit is made to be released quickly for use in subsequent depositing operations and, where metal forms are employed, in that it minimizes the corrosive effect of certain constituents of the deposit upon the forms, which constituents are found to be present to some extent in all vulcanizable rubber compositions. It is obvious that the latter advantage results in the reduced length of time required for cleaning the forms prior to another operation, in less wastage of metal in cleaning the forms thus prolonging their useful life, and also obviates any extensive contamination of the rubber composition due to the corrosion of the forms while the deposit is in contact therewith.

The term "rubber composition" is used herein in a generic sense to indicate caoutchouc, balata, gutta-percha and other rubber-like materials, whether in a vulcanizable or vulcanized condition and whether or not admixed with pigments, fillers, vulcanizing agents, etc.

It will be obvious to those skilled in the art that numerous modifications and variations in the above described process may be made without departing from the principle of the invention herein set forth, and I do not, therefore, desire to limit the claims hereof to the specific process herein described.

This application is a continuation of my copending application Serial No. 224,505, filed October 6, 1927.

I claim:

1. The method of treating rubber compositions which comprises depositing a coagulated layer thereof from an aqueous dispersion and applying a pervious material to the deposit with a compacting pressure to remove a portion of the water content thereof without substantially changing its shape.

2. The method of treating a rubber composition which comprises coagulating a layer of the composition from an aqueous dispersion thereof on a form, and subjecting the rubber composition to a compacting pressure by the application to at least one face of said rubber composition of a pervious material.

3. The method of treating a rubber composition which comprises coagulating a layer of the composition from an aqueous dispersion thereof upon a cylindrical mandrel, and wrapping a pervious material with compacting pressure around the rubber composition while still on the mandrel.

4. The method of treating a rubber composition which comprises coagulating a layer of the composition upon a foundation member from an aqueous dispersion of such composition, applying a pervious material to the deposited rubber composition with a compacting pressure, removing the pervious material, removing the treated layer from the foundation member, and drying it.

5. The method of treating a rubber composition which comprises coagulating a layer of the composition from an aqueous dispersion thereof upon a cylindrical mandrel, and wrapping a pervious material with compacting pressure thereon from one end to the other of the composition.

6. The method of treating a rubber composition which comprises electrodepositing a coagulated layer of the composition from an aqueous dispersion thereof upon a foundation member, applying a pervious material to the deposited rubber with a compacting pressure, removing the pervious material, removing the treated layer from the foundation member, and drying it.

7. The method of treating a rubber composition which comprises electrodepositing a coagulated layer of the composition from an aqueous dispersion thereof upon a cylindrical mandrel, progressively wrapping a woven fabric about the rubber composition from one end to the other under such tension as to exert a substantial compacting pressure, unwrapping the fabric, removing the treated layer from the mandrel, and drying it.

ANDREW SZEGVARI.